United States Patent
Villaire et al.

(10) Patent No.: US 10,309,347 B2
(45) Date of Patent: Jun. 4, 2019

(54) EVAPORATIVE EMISSIONS CONTROL CANISTER PURGE SYSTEM

(71) Applicant: GM GLOBAL TECHNOLOGY OPERATIONS LLC, Detroit, MI (US)

(72) Inventors: William L. Villaire, Clarkston, MI (US); Manoj R. Chaudhari, Clinton Township, MI (US); Edward J. Strzelecki, Oxford, MI (US); Philip A. Yaccarino, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/485,953

(22) Filed: Apr. 12, 2017

(65) Prior Publication Data

US 2018/0298850 A1 Oct. 18, 2018

(51) Int. Cl.
*F02M 25/08* (2006.01)
(52) U.S. Cl.
CPC ...... *F02M 25/089* (2013.01); *F02M 25/0872* (2013.01)
(58) Field of Classification Search
CPC ..... F02D 41/003; F02D 41/042; F02M 25/08; F02M 25/0872; F02M 25/089; F02M 25/36; F02M 25/54
USPC .............. 123/495, 497, 506, 509, 514, 516, 123/518–520
See application file for complete search history.

(56) References Cited

U.S. PATENT DOCUMENTS

| | | | | |
|---|---|---|---|---|
| 6,659,087 B1* | 12/2003 | Reddy | ................. | F02D 41/0045 123/357 |
| 6,854,492 B2* | 2/2005 | Benjey | ............. | B60K 15/03519 123/519 |
| 8,474,439 B2* | 7/2013 | Makino | ............. | F02M 25/0836 123/514 |
| 9,217,402 B2* | 12/2015 | Dudar | ....................... | B08B 5/04 |
| 2005/0139197 A1* | 6/2005 | Ohhashi | ................ | F02D 41/266 123/520 |
| 2011/0214646 A1* | 9/2011 | Makino | .................. | B01D 50/00 123/518 |
| 2014/0182360 A1* | 7/2014 | Horiba | ................ | G01M 3/2876 73/40.5 R |
| 2015/0013437 A1* | 1/2015 | Takakura | ........... | F02M 25/0818 73/40.5 R |

* cited by examiner

*Primary Examiner* — Hung Q Nguyen
*Assistant Examiner* — Johnny H Hoang
(74) *Attorney, Agent, or Firm* — Cantor Colburn LLP

(57) ABSTRACT

An evaporative emissions control system includes an evaporative emissions control canister, a first fuel vapor return conduit including a first end fluidically connected the evaporative emissions control canister and a second end connectable to an internal combustion (IC) engine. A first valve is fluidically connected to the first fuel vapor return conduit. A second fuel vapor return conduit includes a first end portion fluidically connected to the first fuel vapor return conduit and a second end portion configured to be arranged in a vehicle fuel tank. A second valve is fluidically connected to the second fuel vapor return conduit at the second end portion in the vehicle fuel tank. A vapor return system includes a pump fluidically connected to the second valve in the vehicle fuel tank.

15 Claims, 4 Drawing Sheets

EVAPORATIVE EMISSIONS CONTROL CANISTER PURGE SYSTEM

INTRODUCTION

The subject disclosure relates to an emissions control system and, more particularly, to an evaporative emissions canister purge system for an emissions control system.

Most vehicles powered by an internal combustion (IC) engine include one or more emissions control systems. The emissions control system reduces undesirable emissions associated with burning and/or transporting fossil fuels. Emissions control system may include aftertreatment systems that treat gases produced by burning fossil fuels and evaporative control systems that capture vapors that may be emitted by fossil fuel residing in a vehicle fuel tank. In the United States, and other countries, modern vehicles include fuel systems that do not vent directly to atmosphere. Instead, the fuel systems vent through an evaporative emissions control canister that traps fuel vapor. Additional fuel vapor may be collected at a vapor dome of the vehicle fuel tank. A portion of the fuel vapor in the vapor dome may condense and re-mix with existing fuel in the vehicle fuel tank.

Evaporative emission control canisters may include activated carbon. Fuel vapor may be ducted from the vehicle fuel tank into the evaporative emissions control canister. The activated carbon absorbs the fuel vapor within the evaporative emissions control canister. During certain times of vehicle operation, fresh air is drawn through the evaporative emissions control canister pulling the fuel vapor out of the activated carbon and into the IC engine to be burned. Evaporative emissions control systems include a number of components that must be fluidically connected between the vehicle fuel tank and the IC engine. Evaporative emissions control canisters may be bulky and take up valuable vehicle space. Accordingly, it is desirable to provide for an evaporative emissions control system that has a smaller footprint without affecting performance.

SUMMARY

An evaporative emissions control system includes an evaporative emissions control canister, a first fuel vapor return conduit including a first end fluidically connected the evaporative emissions control canister and a second end connectable to an internal combustion (IC) engine. A first valve is fluidically connected to the first fuel vapor return conduit. A second fuel vapor return conduit includes a first end portion fluidically connected to the first fuel vapor return conduit and a second end portion configured to be arranged in a vehicle fuel tank. A second valve is fluidically connected to the second fuel vapor return conduit at the second end portion in the vehicle fuel tank. A vapor return system includes a pump fluidically connected to the second valve in the vehicle fuel tank.

In addition to one or more of the features described above or below, or as an alternative, further embodiments could include wherein the pump comprises an eductor pump.

In addition to one or more of the features described above or below, or as an alternative, further embodiments could include wherein the eductor pump includes a fuel inlet and a fuel outlet, the fuel outlet.

In addition to one or more of the features described above or below, or as an alternative, further embodiments could include wherein the vapor return system includes a vapor reservoir fluidically connected to the second fuel vapor return conduit, the fuel outlet of the eductor pump being arranged in the vapor reservoir.

In addition to one or more of the features described above or below, or as an alternative, further embodiments could include wherein the vapor return system includes a diffuser fluidically connected to the vapor reservoir, the diffuser being arranged downstream of the fuel outlet.

In addition to one or more of the features described above or below, or as an alternative, further embodiments could include wherein the second fuel vapor return conduit is fluidically connected to the first fuel vapor return conduit between the evaporative emissions control canister and the first valve.

A motor vehicle includes an internal combustion (IC) engine, a vehicle fuel tank fluidically connected to the IC engine, and an evaporative emissions control system fluidically connected to the IC engine and the vehicle fuel tank. The evaporative emissions control system includes an evaporative emissions control canister, a first fuel vapor return conduit including a first end fluidically connected the evaporative emissions control canister and a second end fluidically connected to the internal combustion (IC) engine, and a first valve fluidically connected to the first fuel vapor return conduit. A second fuel vapor return conduit includes a first end portion fluidically connected to the first fuel vapor return conduit and a second end portion arranged in the vehicle fuel tank. A second valve is fluidically connected to the second fuel vapor return conduit at the second end portion in the vehicle fuel tank. A vapor return system includes a pump fluidically connected to the second valve in the vehicle fuel tank.

In addition to one or more of the features described above or below, or as an alternative, further embodiments could include wherein the pump comprises an eductor pump.

In addition to one or more of the features described above or below, or as an alternative, further embodiments could include wherein the eductor pump includes a fuel inlet and a fuel outlet, the fuel outlet.

In addition to one or more of the features described above or below, or as an alternative, further embodiments could include wherein the vapor return system includes a vapor reservoir fluidically connected to the second fuel vapor return conduit, the fuel outlet of the eductor pump being arranged in the vapor reservoir.

In addition to one or more of the features described above or below, or as an alternative, further embodiments could include wherein the vapor return system includes a diffuser fluidically connected to the vapor reservoir, the diffuser being arranged downstream of the fuel outlet.

In addition to one or more of the features described above or below, or as an alternative, further embodiments could include wherein the second fuel vapor return conduit is fluidically connected to the first fuel vapor return conduit between the evaporative emissions control canister and the first valve.

In addition to one or more of the features described above or below, or as an alternative, further embodiments could include wherein the vehicle fuel tank includes a vapor dome.

In addition to one or more of the features described above or below, or as an alternative, further embodiments could include wherein the vapor return system is arranged in the vapor dome.

In addition to one or more of the features described above or below, or as an alternative, further embodiments could include wherein the vapor return system is arranged in a bottom portion of the vehicle fuel tank.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
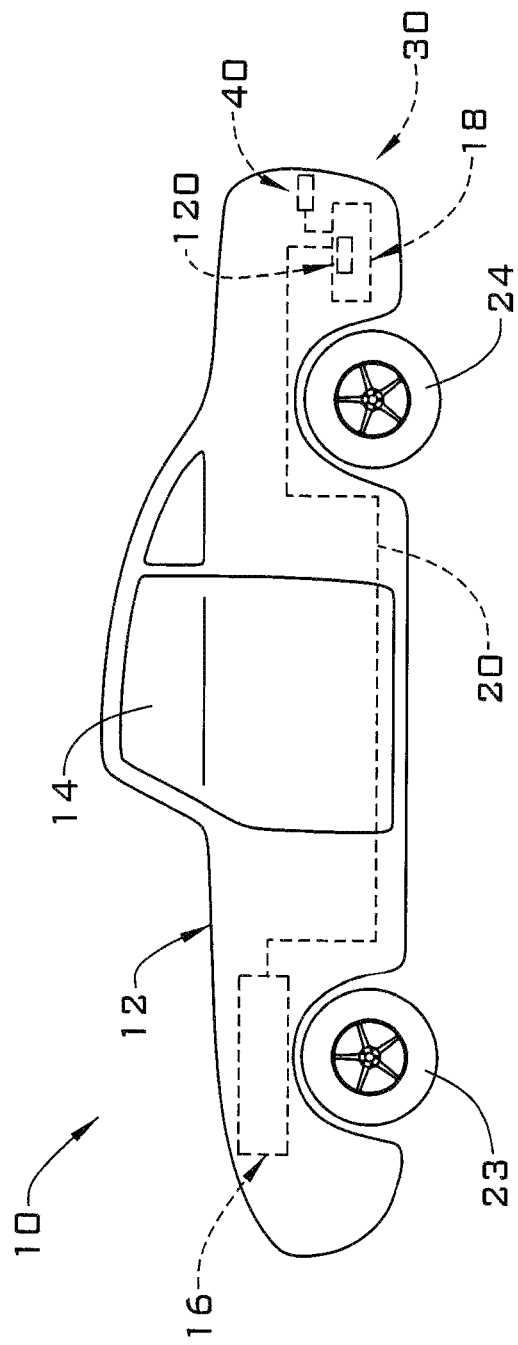
FIG. 1 depicts a motor vehicle including an evaporative emissions control system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A motor vehicle, in accordance with an exemplary embodiment, is illustrated generally at 10 in FIG. 1. Motor vehicle 10 includes a body 12 having a passenger compartment 14. Motor vehicle 10 is powered by a prime mover in the form of an internal combustion (IC) engine 16 that receives fuel from a vehicle fuel tank 18 via a fuel line 20. Motor vehicle 10 is also shown to include front wheels 23 and rear wheels 24. Front and/or rear wheels 23, 24 may be mechanically connected to IC engine 16 through for example, one or more of a transmission (not shown), a transaxle (also not shown) or the like.

Figure 2:
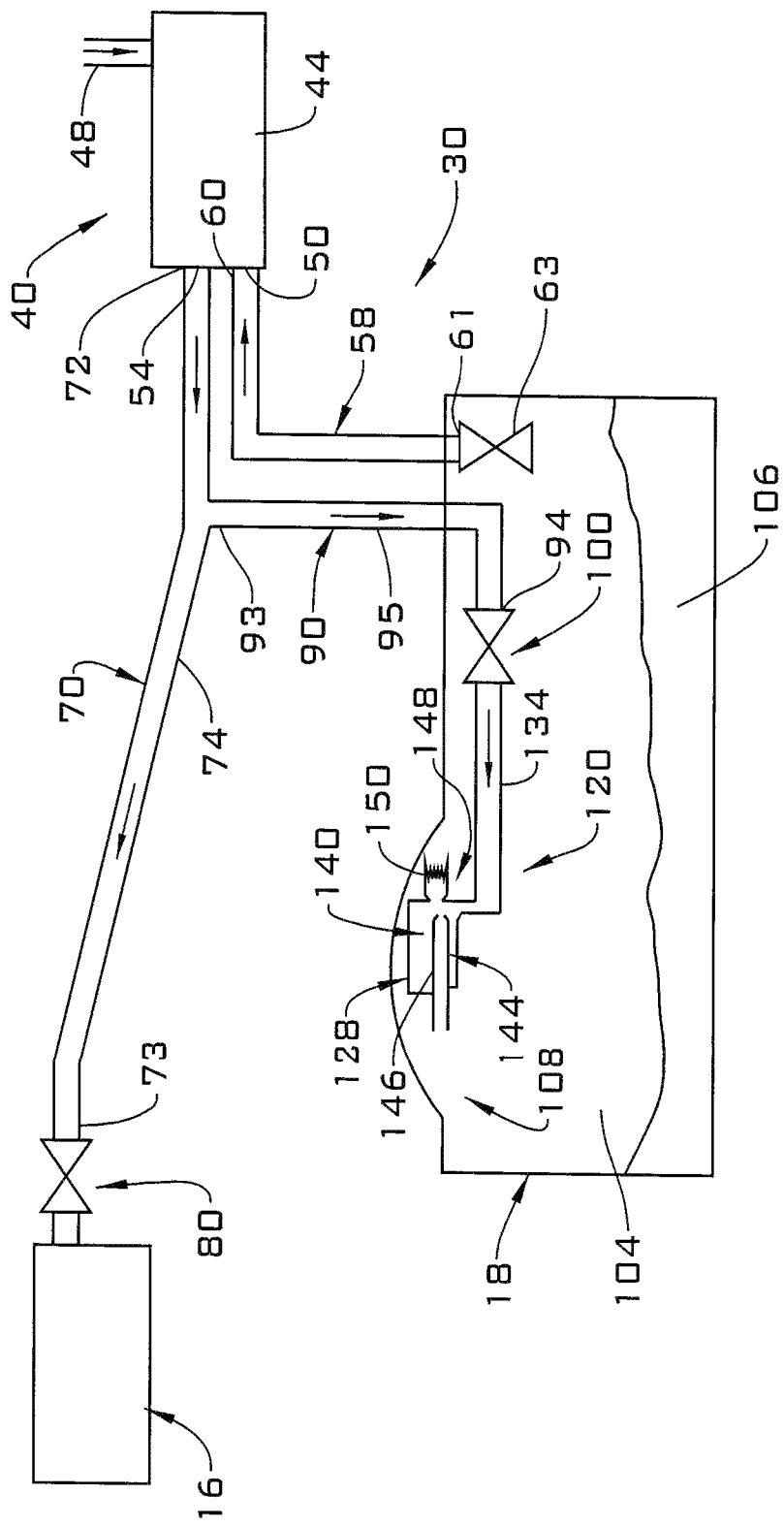
FIG. 2 is a block diagram illustrating the evaporative emissions control system, in accordance with an aspect of an exemplary embodiment.

In accordance with an exemplary embodiment, motor vehicle 10 includes an evaporative emissions control system 30 that delivers fuel vapors from vehicle fuel tank 18 to IC engine 16 or back to vehicle fuel tank 18 to condense and mix with existing fuel. As best shown in FIG. 2, evaporative emissions control system 30 includes an evaporative emissions control canister 40 that may be filled with activated carbon 44. Activated carbon 44 may absorb and store fuel vapors passing from vehicle fuel tank 18. In the embodiment shown, evaporative emissions control canister 40 includes a fresh or ambient air inlet 48, a vapor inlet 50, and a vapor outlet 54. Vapor inlet 50 is fluidically connected to vehicle fuel tank 18 through a vapor inlet conduit 58. Vapor inlet conduit 58 includes a first end section 60 fluidically connected to evaporative emissions control canister 40, and a second end section 61 extending into vehicle fuel tank 18. Second end section 61 is connected to an outlet valve 63.

In further accordance with an exemplary aspect, vapor outlet 54 is fluidically connected to IC engine 16 through a first fuel vapor return conduit 70. First fuel vapor return conduit 70 includes a first end 72 fluidically coupled to evaporative emissions control canister 40 at vapor outlet 54, a second end 73 fluidically connected to IC engine 16, and an intermediate segment 74. A first valve 80 is arranged at second end 73. A second fuel vapor return conduit 90 is fluidically connected between first fuel vapor return conduit 70 and vehicle fuel tank 18. Second fuel vapor return conduit 90 includes a first end portion 93 fluidically connected to intermediate segment 74, a second end portion 94 extending into vehicle fuel tank 18 and an intermediate portion 95. A second valve 100 is arranged at second end portion 94.

In the exemplary embodiment shown, vehicle fuel tank 18 includes an interior zone 104 holding an amount of fuel 106 and a vapor dome 108 arranged at an upper portion thereof. A vapor return system 120 is arranged within interior zone 104 in vapor dome 108. Vapor return system 120 includes a vapor reservoir 128 fluidically connected to second valve 100 through a conduit 134. A pump 140 is arranged in vapor reservoir 128. Pump 140 may take the form of an eductor pump 144 having a venturi member 146. Venturi member 146 is fluidically connected to a pressurized source of fuel, for example, a vehicle fuel pump (not shown). Venturi member 146 includes a fuel inlet (not separately labeled) and a tapered fuel outlet (also not separately labeled) that is directed towards a diffuser 148 including a diffuser element 150.

Figure 3:
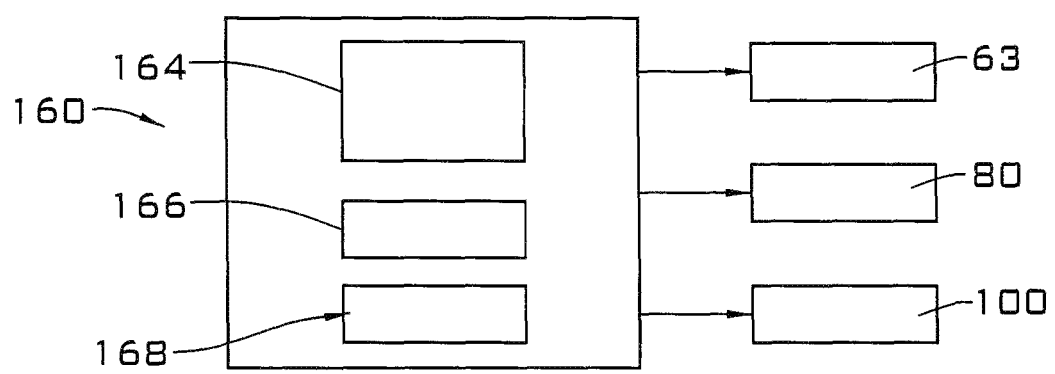
FIG. 3 is a block diagram illustrating an evaporative emissions control module, in accordance with an aspect of an exemplary embodiment.

In accordance with an aspect of an exemplary embodiment, when it is desired to purge evaporative emissions control canister 40 of fuel vapors, an evaporative emissions control module 160 shown in FIG. 3 closes outlet valve 63 and opens one or more of first valve 80 and second valve 100. Evaporative emissions control module 160 may include a central processing unit (CPU) 164, a non-volatile memory 166, and an evaporative valve control module 168. It is to be understood that CPU 164, non-volatile memory 166, and evaporative valve control module 168 may be collocated or may be arranged in separate areas of motor vehicle 10.

Evaporative emissions control module 160 selectively opens first valve 80 to connect evaporative emissions control canister 40 with IC engine 16, second valve 100 may be opened to fluidically connect evaporative emissions control canister 40 with vapor return system 120 and/or first and second valves 80, 100 may each be opened a selected amount as determined by evaporative valve control module 168 based on parameters stored in non-volatile memory 166 so as to deliver a first quantity of fuel vapor from evaporative emissions control canister 40 to IC engine 16 and a second quantity of fuel vapor from evaporative emissions control canister 40 to vapor return system 120. The particular volumes of vapor associated with each of the first quantity and the second quantity may vary and may be selectively controllable by evaporative emissions control module 160.

In further accordance with an exemplary embodiment, pressurized fuel may be passed into the fuel inlet of venturi member 146. The pressurized fuel flows out of the tapered fuel outlet toward diffuser element 150 creating a low pressure zone in vapor reservoir 128. The low pressure zone developed by venturi member 146 draws fuel vapor into vapor reservoir 128 from evaporative emissions control canister 40. The fuel vapor may mix with the pressurized fuel flowing from venturi member 146 through diffuser element 150 and pass into vapor dome 108. Any uncondensed fuel vapor may then condense in vapor dome 108 and pass into fuel carried by vehicle fuel tank 18.

Figure 4:
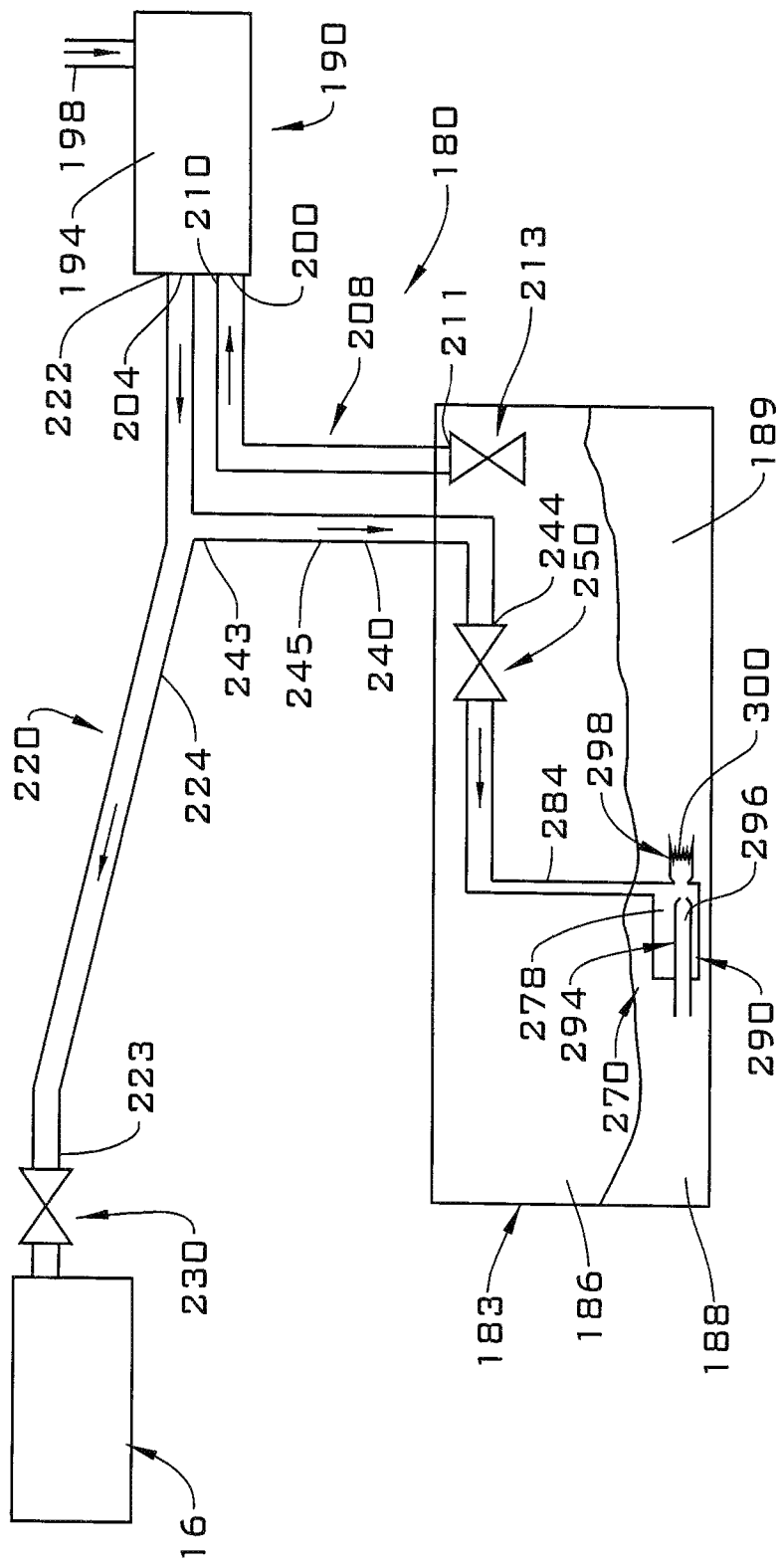
FIG. 4 is a block diagram illustrating the evaporative emissions control system, in accordance with another aspect of an exemplary embodiment.

Reference will now follow to FIG. 4 in describing an evaporative emissions control system 180 in accordance with another aspect of an exemplary embodiment. A vehicle fuel tank 183 includes an interior zone 186 having a bottom portion 188. Interior zone 186 may contain an amount of fuel 189. Vapor produced by the fuel in vehicle fuel tank 183 is captured by evaporative emissions control system 180.

In accordance with an aspect of an exemplary embodiment, evaporative emissions control system 180 includes an evaporative emissions control canister 190 that may be filled with activated carbon 194. Activated carbon 194 may absorb and store fuel vapors passing from vehicle fuel tank 183. In the embodiment shown, evaporative emissions control canister 190 includes a fresh or ambient air inlet 198, a vapor inlet 200, and a vapor outlet 204. Vapor inlet 200 is fluidically connected to vehicle fuel tank 183 through a vapor inlet conduit 208. Vapor inlet conduit 208 includes a first end section 210 fluidically connected to evaporative emissions control canister 190 and a second end section 211 extending into vehicle fuel tank 180. Second end section 211 is connected to an outlet valve 213.

In further accordance with an exemplary aspect, vapor outlet 204 is fluidically connected to IC engine 16 through a first fuel vapor return conduit 220. First fuel vapor return conduit 220 includes a first end 222 fluidically coupled to evaporative emissions control canister 190 at vapor outlet 204, a second end 223 fluidically connected to IC engine 16, and an intermediate segment 224. A first valve 230 is arranged at second end 223. A second fuel vapor return conduit 240 is fluidically connected between first fuel vapor return conduit 220 and vehicle fuel tank 18. Second fuel vapor return conduit 240 includes a first end portion 243 fluidically connected to intermediate segment 224, a second end portion 244 extending into vehicle fuel tank 183, and an intermediate portion 245. A second valve 250 is arranged at second end portion 244.

A vapor return system 270 is arranged within interior zone 186 at bottom portion 188. Vapor return system 270 includes a vapor reservoir 278 fluidically connected to second valve 250 through a conduit 284. A pump 290 is arranged in vapor reservoir 278. Pump 290 may take the form of an eductor pump 294 having a venturi member 296. Venturi member 296 is fluidically connected to a pressurized source of fuel, for example, a vehicle fuel pump (not shown). Venturi member 296 includes a fuel inlet (not separately labeled) and a tapered fuel outlet (also not separately labeled) that is directed towards a diffuser 298 including a diffuser element 300. In the exemplary embodiment shown, fuel vapor passing through diffuser element 300 immediately condenses with the amount of fuel 189 in vehicle fuel tank 183. Evaporative emissions control system 180 operates in a manner similar to that described above.

At this point it should be appreciated that the use of a pump in the vehicle fuel tank may cause additional fuel vapor to be drawn out of the evaporative emissions control canister. Further, the use of duel circuit, e.g., a circuit connected to the IC engine and a circuit connected to the fuel tank, and locating the evaporative emissions control canister closer to the fuel tank may enhance vapor recovery that improves emissions control and allows for a reduction in size of the canister.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the application.

What is claimed is:

1. An evaporative emissions control system comprising:
    an evaporative emissions control canister;
    a first fuel vapor return conduit including a first end fluidically connected to the evaporative emissions control canister and a second end connectable to an internal combustion (IC) engine;
    a first valve fluidically connected to the first fuel vapor return conduit;
    a second fuel vapor return conduit including a first end portion fluidically connected to the first fuel vapor return conduit and a second end portion configured to be arranged in a vehicle fuel tank;
    a second valve fluidically connected to the second fuel vapor return conduit at the second end portion in the vehicle fuel tank;
    a vapor return system including a pump fluidically connected to the second valve in the vehicle fuel tank; and
    a vapor inlet conduit extending from the vehicle fuel tank to the evaporative emissions control canister, the vapor inlet conduit including an outlet valve.

2. The evaporative emissions control system according to claim 1, wherein the pump comprises an eductor pump.

3. The evaporative emissions control system according to claim 2, wherein the eductor pump includes a fuel inlet and a fuel outlet fluidically exposed to the vehicle fuel tank.

4. The evaporative emissions control system according to claim 3, wherein the vapor return system includes a vapor reservoir fluidically connected to the second fuel vapor return conduit, the fuel outlet of the eductor pump being arranged in the vapor reservoir.

5. The evaporative emissions control system according to claim 4, wherein the vapor return system includes a diffuser fluidically connected to the vapor reservoir, the diffuser being arranged downstream of the fuel outlet of the eductor pump.

6. The evaporative emissions control system according to claim 1, wherein the second fuel vapor return conduit is fluidically connected to the first fuel vapor return conduit between the evaporative emissions control canister and the first valve.

7. A motor vehicle comprising:
    an internal combustion (IC) engine;
    a vehicle fuel tank fluidically connected to the IC engine; and
    an evaporative emissions control system fluidically connected to the IC engine and the vehicle fuel tank, the evaporative emissions control system comprising:
    an evaporative emissions control canister;
    a first fuel vapor return conduit including a first end fluidically connected to the evaporative emissions control canister and a second end fluidically connected to the internal combustion (IC) engine;
    a first valve fluidically connected to the first fuel vapor return conduit;
    a second fuel vapor return conduit including a first end portion fluidically connected to the first fuel vapor return conduit and a second end portion arranged in the vehicle fuel tank;
    a second valve fluidically connected to the second fuel vapor return conduit at the second end portion in the vehicle fuel tank;

a vapor return system including a pump fluidically connected to the second valve in the vehicle fuel tank; and a vapor inlet conduit extending from the vehicle fuel tank to the evaporative emissions control canister, the vapor inlet conduit including an outlet valve.

8. The motor vehicle according to claim 7, wherein the pump comprises an eductor pump.

9. The motor vehicle according to claim 8, wherein the eductor pump includes a fuel inlet and a fuel outlet, the fuel outlet being fluidically exposed to the vehicle fuel tank.

10. The motor vehicle according to claim 9, wherein the vapor return system includes a vapor reservoir fluidically connected to the second fuel vapor return conduit, the fuel outlet of the eductor pump being arranged in the vapor reservoir.

11. The motor vehicle according to claim 10, wherein the vapor return system includes a diffuser fluidically connected to the vapor reservoir, the diffuser being arranged downstream of the fuel outlet.

12. The motor vehicle according to claim 7, wherein the second fuel vapor return conduit is fluidically connected to the first fuel vapor return conduit between the evaporative emissions control canister and the first valve.

13. The motor vehicle according to claim 7, wherein the vehicle fuel tank includes a vapor dome.

14. The motor vehicle according to claim 13, wherein the vapor return system is arranged in the vapor dome.

15. The motor vehicle according to claim 7, wherein the vapor return system is arranged in a bottom portion of the vehicle fuel tank.

\* \* \* \* \*